United States Patent [19]
Strauch et al.

[11] 3,763,543
[45] Oct. 9, 1973

[54] METHOD OF PROVIDING THE CYLINDRICAL INNER SURFACE OF A LENS MOUNT WITH ROLLS AND LENS MOUNT PROVIDED THEREWITH

[75] Inventors: Ernst Strauch, Naunheim; Gerhard Bleier, Atzbach, both of Germany

[73] Assignee: Ernst Leitz GmbH, Wetzlar, Germany

[22] Filed: Dec. 13, 1971

[21] Appl. No.: 207,038

[30] Foreign Application Priority Data
Dec. 15, 1970 Germany................... P 20 61 661.9

[52] U.S. Cl....................... 29/406, 72/113, 350/252
[51] Int. Cl.............................................. B23q 17/00
[58] Field of Search.......................... 350/245, 252; 72/113, 365, 366, 370; 29/406

[56] References Cited
UNITED STATES PATENTS

| 3,427,703 | 2/1969 | Baade | 29/406 |
| 3,258,838 | 7/1966 | Tilton | 29/406 |
| 649,341 | 5/1900 | Nevill | 72/113 |
| 2,497,147 | 2/1950 | Washam | 350/252 |
| 2,465,083 | 3/1949 | Gradisar | 350/252 |

*Primary Examiner*—Lowell A. Larson
*Attorney*—Krafft & Wells

[57] ABSTRACT

Into the inner surface of a cylindrical lens mount grooves are pressed by means of a roller member so that the material on either side of the groove folds from the general level of the surface into the interior space and form rolls. The diameter between the rolls is then sized to the exact size and the lenses, lens elements and pre-mounted lenses are supported on the rolls.

1 Claim, 2 Drawing Figures

METHOD OF PROVIDING THE CYLINDRICAL INNER SURFACE OF A LENS MOUNT WITH ROLLS AND LENS MOUNT PROVIDED THEREWITH

BACKGROUND OF THE INVENTION

The invention relates to the mounts of optical lenses, objectives etc. In particular, it relates to a method of providing the inner surface of a cartridge-shaped mount with rolls between which the lenses are supported.

It is already known to provide the inner surface of a lens mount with elastic rolls which extend parallel to the optical axis. The rolls exert a pressure on the lenses in radial inward direction so that the lenses are thereby automatically centered.

In the German Pat. Nos. 1,122,738 and 1,127,110 lens mounts are illustrated which are provided with such elastic rolls. The cartridges wherein the lenses are retained are subdivided into two halves in longitudinal direction. The lenses are supported between them and the two halves are kept together by a second cartridge.

It is, however, rather expensive to manufacture these prior art rolls in the mounts. The mounts are provided with grooves and elastic material is inserted into the grooves so that the rolls are formed. Besides, such mounts comprise three component parts which in itself is a severe disadvantage.

It is therefore an object of the invention to find a method of providing lens mounts with such rolls in a simple and inexpensive manner. And it is a further object to provide the rolls in the mount without subdividing it into two parts.

SUMMARY OF THE INVENTION

The above stated objects are attained by pressing grooves into the inner wall of the lens mount by means of a suitable instrument, preferably by a roller member. The material on either side of the instrument is thereby folded from the general level of the surface in a radial inward direction, thereby forming two rolls. A sizing and gauging tool is then pressed through the mount so that the diameter between the rolls is adjusted to the required size.

In each mount an evenly distributed number of rolls, preferably at least three, may be generated which extend in parallel to the optical axis. However, the rolls may also extend along a helical line or in a direction perpendicular to the optical axis.

Preferably, the instrument pressing the groove into the material and the gauging tool are combined to form a unit.

BRIEF DESCRIPTION OF THE DRAWINGS

The invention will be more readily comprehended from the following description when taken in conjunction with the appending drawings, wherein.

DESCRIPTION OF THE PREFERRED EMBODIMENT

Figure 1:
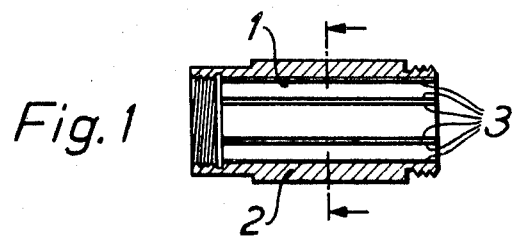
FIG. 1 is a longitudinal sectional view of a lens mount provided with rolls.
Figure 2:
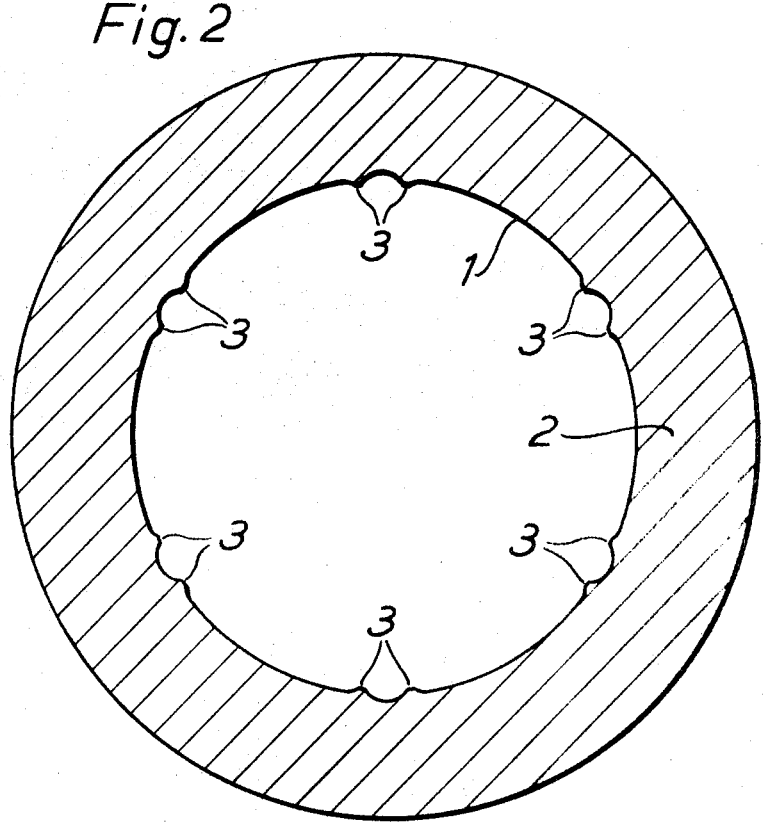
FIG. 2 is a cross sectional view of the lens mount of FIG. 1.

Referring now to the drawings, in FIG. 1 a lens mount 2 is schematically shown which has an inner wall 1. As can be seen from FIG. 2 the lens mount is of cylindrical shape and is adapted to receive and hold single lens elements, cemented lenses and also pre-mounted lenses.

The inner wall 1 is provided with rolls 3 extending along the wall in a direction parallel to the optical axis. The rolls are made by guiding a pressing tool, preferably a roller member, through the lens mount so that grooves are generated and a roll folds up on either side of the tool.

The lenses to be mounted are of a slightly smaller diameter than the diameter of the inner wall 1; but they are of a slightly greater diameter than exists between the rolls. After producing the rolls, the diameter between the walls is therefore sized to the exact size of the lens diameter so that the lenses are retained between the grooves without play.

Folding-up the rolls and the calibration of the exact diameter may be performed in two different working processes, however, the necessary tools may also be combined to form one unit so that both operations may be performed in only one working process.

According to the Figures the rolls extend in parallel to the optical axis. However, they may also extend in a winding line, i.e. a helical line. Such helical lines can be imagined if one thinks of the one end of the lens mount 2 kept fixed while the other end is slightly wound. Helical lines will be preferred if the lens mount is of a material through which the tool may be easier screwed or threaded than pressed in a straight direction.

By the invented method it is thus possible to provide rolls within the lens mount without subdividing the mount into two parts. Simple tools may be used and the quality of the finished product, as regards the exactness of the sized diameter, is greatly superior to prior art products.

What is claimed is:

1. A method of mounting lenses, lens elements or premounted lenses having a given diameter in a lens mount having a cylindrical inner surface with a diameter greater than said given diameter comprising:
   a. pressing at least three evenly distributed grooves into the said cylindrical inner surface and forming at the edges of each groove two parallel rolls;
   b. sizing the internal diameter generated by said rolls to said given diameter; and
   c. mounting said lenses, lens elements or premounted lenses in said lens mount in contact with said rolls.

* * * * *